United States Patent [19]

Renlund et al.

[11] Patent Number: 4,530,808

[45] Date of Patent: Jul. 23, 1985

[54] BINDER REMOVAL FROM THERMOPLASTICALLY FORMED SIC ARTICLE

[75] Inventors: Gary M. Renlund, Scotia; Curtis A. Johnson, Schenectady, both of N.Y.

[73] Assignee: General Electric Company, Schenectady, N.Y.

[21] Appl. No.: 599,032

[22] Filed: Apr. 11, 1984

[51] Int. Cl.$^3$ .................... C04B 35/36; C04B 35/64
[52] U.S. Cl. ...................... 264/63; 501/88; 501/90; 264/65
[58] Field of Search ............ 264/63, 65; 501/88, 501/90

[56] References Cited

U.S. PATENT DOCUMENTS

| | | | |
|---|---|---|---|
| 3,351,688 | 11/1967 | Kingery et al. | 264/63 |
| 3,882,210 | 5/1975 | Alexander et al. | 423/346 |
| 4,004,934 | 1/1977 | Prochazka | 501/90 |
| 4,041,117 | 8/1977 | Prochazka | 501/90 |
| 4,144,207 | 3/1979 | Ohnsorg | 501/90 |
| 4,207,226 | 6/1980 | Storm | 501/88 |
| 4,233,256 | 11/1980 | Ohnsorg | 264/63 |
| 4,312,954 | 1/1982 | Coppola et al. | 501/90 |
| 4,424,179 | 1/1984 | Minjolle et al. | 264/63 |

OTHER PUBLICATIONS

"Rate-Controlled Extraction Unit for Removal of Organic Binders from Injection-Moulded Ceramics", Johnson et al., the Swedish Institute for Silicate Research (before 1984).

*Primary Examiner*—Mark L. Bell
*Attorney, Agent, or Firm*—Jane M. Binkowski; James C. Davis, Jr.; James Magee, Jr.

[57] ABSTRACT

A sintered SiC body is produced by forming a thermoplastically moldable ceramic composition comprised of sinterable silicon carbide powder and binder, thermoplastically molding the ceramic composition into a body, embedding the body in nominally spherical particles having a density greater than 80% of the particle's theoretical density and being selected from the group consisting of polycrystalline silicon carbide, free carbon-coated polycrystalline silicon carbide, free carbon and mixtures thereof, baking the embedded body to remove the binder therefrom, recovering and sintering said baked body.

14 Claims, No Drawings

BINDER REMOVAL FROM THERMOPLASTICALLY FORMED SIC ARTICLE

The present invention is directed to removing binder from a thermoplastically formed body of sinterable silicon carbide powder. More particularly, it relates to binder removal from the molded silicon carbide body by utilizing a particular embedding powder.

The chemical and physical properties of silicon carbide make it an excellent material for both low and high temperature structural applications. These properties include good oxidation resistance and corrosion behavior, high thermal conductivity, low thermal expansion coefficient, high thermal shock resistance and high strength at elevated temperature. This unique combination of properties suggests the use of silicon carbide as components for gas turbines, check valves for handling corrosive liquids, linings of ball mills, heat exchangers and refractories for high temperature furnaces, pumps for die casting machines and combustion tubes.

In the fabrication of complex shaped ceramic articles by injection molding or other thermoplastic forming techniques, the step which most commonly causes unacceptable distortion and other defects is the binder, i.e. binder/vehicle, removal step. The binder/vehicle is commonly removed by thermal decomposition or pyrolysis. In heating to the decomposition temperature, the molded body, i.e. powder/binder composite, passes from a high viscosity solid at room temperature to a moderate viscosity liquid above the melting point of the binder/vehicle. In articles weighing more than a few grams, the gravitational force from its own weight generally distorts the shaped article to an unacceptable degree. Therefore, the problem is to develop a means of minimizing distortion of hollow and/or complex-shaped articles during the binder/vehicle removal step without creating other objectionable defects in the process.

The use of powder beds for distributing the weight of very weak powder compacts during sintering is common in the ceramic community.

According to the present invention, distortion and other defects generated during the binder/vehicle removal step of thermoplastically formed silicon carbide ceramic articles can be minimized by immersing the article in the present embedding powder.

The present embedding powder is a flowable powder comprised of spherical or nominally spherical particles of a particular density and composition. The present embedding powder provides support which is sufficiently buoyant to prevent distortion or significant distortion of the embedded molded silicon carbide body during baking thereof to remove the binder.

Briefly stated, one embodiment of the present invention comprises an improvement in the process of producing a sintered body of polycrystalline silicon carbide having a density greater than 80% of the theoretical density for silicon carbide wherein a thermoplastically molded body of sinterable silicon carbide powder and thermoplastic binder is formed, baked to remove said binder and sintered to produce said sintered body, the improvement comprising embedding said molded body in spherical or nominally spherical embedding particles having a density greater than 80% of the theoretical density for said embedding particle and being selected from the group consisting of polycrystalline silicon carbide, free carbon-coated polycrystalline silicon carbide, free carbon and mixtures thereof, said embedding particles having an average diameter ranging from about 10 microns to about 1000 microns, and baking said embedded body to thermally remove said binder leaving no amount thereof which would have a significantly deleterious effect on said sintered body and recovering said baked body.

Briefly stated, in another embodiment, the present invention comprises a process for producing a sintered polycrystalline silicon carbide body which comprises forming a thermoplastically moldable ceramic composition comprising a substantially homogeneous mixture comprising from about 40% by volume to about 60% by volume of a sinterable silicon carbide powder having an average particle size which is submicron and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive selected from the group consisting of free carbon, a carbonaceous organic material and mixtures thereof equivalent to from about 0.1% by weight to about 5% by weight of free carbon based on said silicon carbide, said carbonaceous organic material completely decomposing at a temperature ranging from 50° C. up to 450° C. to said free carbon and gaseous product of decomposition, and the balance being a thermoplastic organic binder which is thermally removable at a temperature ranging up to 450° C., thermoplastically molding said ceramic composition producing a molded body, embedding said molded body in spherical or nominally spherical embedding particles having a density greater than 80% of the theoretical density for said embedding particle and being selected from the group consisting of polycrystalline silicon carbide, free carbon-coated polycrystalline silicon carbide, free carbon and mixtures thereof, said embedding particles having an average diameter ranging from about 10 microns to about 1000 microns, baking said embedded molded body at a heating rate which has no significant deleterious effect thereon at a temperature ranging up to 450° C. removing said binder leaving no amount therein which would have a significantly deleterious effect on said sintered body, said baking having no significant deleterious effect on said body, recovering the resulting baked body and sintering said baked body at a temperature ranging from about 1900° C. to about 2300° C. producing said sintered body having a density greater than 80% of the theoretical density for silicon carbide.

In the present invention, the thermoplastically moldable ceramic composition is comprised of a uniform or substantially uniform mixture, e.g. a homogeneous or substantially homogeneous dispersion, of the sinterable silicon carbide powder and binder. More specifically, the moldable ceramic composition contains the sinterable silicon carbide composition as a homogeneous or substantially homogeneous dispersion having an average particle size which is submicron and which is composed of silicon carbide and the boron and carbonaceous additives.

The present binder is a thermoplastic organic polymeric material which is suitable, i.e. useful, for thermoplastic molding, particularly injection molding, of the present sinterable silicon carbide powder. Also, the present binder is thermally removable from the present thermally molded body at a temperature ranging up to 450° C. to leave no significant amount thereof. It is removed primarily by evaporation and/or thermal decomposition to produce a gaseous product which is removed as a vapor at an elevated temperature ranging from above room temperature, i.e. above 25° C. up to 450° C.

Preferably, the binder used herein is the one disclosed in Ser. No. 599,031 "THERMOPLASTIC MOLDING OF SINTERABLE SILICON CARBIDE" filed on even date herewith for G. M. Renlund and C. A. Johnson, assigned to the assignee hereof and incorporated herein by reference, which discloses a thermoplastically moldable ceramic composition comprised of from about 40% to about 60% by volume of a sinterable silicon carbide powder and the balance is a binder comprised of an organic acid and a copolymer of ethylene and from greater than about 12 weight % to about 33 weight %, preferably at least about 13 weight %, more preferably from about 14 weight % to about 30 weight %, most preferably from about 18 weight % to about 28 weight % vinyl acetate, said organic acid having a melting point ranging from about 44° C. to about 88° C. and ranging from greater than about 18% by weight up to about 45% by weight, preferably from about 20% by weight to about 40% by weight, most preferably from about 25% by weight to about 35% by weight of the total weight of the binder. The copolymer has a melt index according to ASTM D1238 ranging from about 12 to about 30, and preferably, it contains about 25 weight % vinyl acetate and has a melt index of about 19. The organic acid contains from 12 carbon atoms to 26 carbon atoms per molecule, and preferably, it is selected from the group consisting of lauric acid (melting point ~44° C.), stearic acid (melting point ~70° C.), cerotic acid (melting point ~88° C.), and mixtures thereof, and most preferably it is stearic acid. Also, preferably, the organic acid is used in an amount of about 30% by weight of the total weight of the binder.

The present sinterable silicon carbide powder is comprised of a homogeneous dispersion or at least a substantially homogeneous dispersion having an average particle size which is submicron, preferably having an average particle size which ranges from about 0.05 micron up to about 1 micron, and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive selected from the group consisting of free carbon, a carbonaceous organic material and mixtures thereof equivalent to from about 0.1% to about 5% by weight of free carbon based on said silicon carbide, said carbonaceous organic material completely decomposing at a temperature ranging from 50° C. up to 450° C. to said free carbon and gaseous product of decomposition.

The silicon carbide powder used in the present invention is α-silicon carbide, β-silicon carbide and mixtures thereof. Preferably, the oxygen content of the silicon carbide powder is less than about 0.4 weight %.

The boron additive is elemental boron, boron carbide or a mixture thereof. The amount of boron additive is equivalent to from about 0.3% to about 3.0% by weight of elemental boron, e.g. about 0.3 part by weight to about 3 parts by weight of elemental boron based on 100 parts by weight of silicon carbide. The particular amount of boron additive used is determinable empirically and depends largely on the degree of dispersion achieved in the mixture since the more thoroughly it is dispersed the more uniform is the density of the sintered product.

The carbonaceous additive is used in an amount equivalent to from about 0.1% by weight to about 5% by weight of free carbon, e.g. about 0.1 part by weight to about 5 parts by weight of free carbon based on 100 parts by weight of silicon carbide. Preferably, the carbonaceous additive is used in an amount equivalent to from about 0.1% by weight to about 2% by weight of free carbon, and most preferably from about 0.1% by weight to about 1% by weight of free carbon, based on silicon carbide. The particular amount of free carbon is determinable empirically and depends on such factors as the degree to which it is dispersed in the powder as well as the oxygen, $SiO_2$ and Si contents of the starting powder with which it reacts and the final density required in the sintered product.

Specifically, the carbonaceous additive can be particulate free carbon of submicron size such as, for example, acetylene black, and/or a carbonaceous organic material which is heat-decomposible to produce particulate free carbon of submicron size in the required amount. In addition, the carbonaceous organic material is a solid or liquid at room temperature and completely decomposes at a temperature in the range of 50° C. up to 450° C. to yield free carbon and gaseous products of decomposition. Also, the carbonaceous organic material is one which has no significant deleterious effect on the silicon carbide, boron additive or the resulting sintered product.

High molecular weight aromatic compounds are the preferred carbonaceous organic materials for making the carbon addition since they ordinarily give on pyrolysis the required yield of particulate free carbon of submicron size. Examples of such aromatic compounds are a phenol-formaldehyde condensate-novolak which is soluble in acetone or higher alcohols, such as butyl alcohol, as well as many of the related condensation products, such as resorcinol-formaldehyde, aniline-formaldehyde, and cresol-formaldehyde. Another satisfactory group of compounds are derivatives of polynuclear aromatic hydrocarbons contained in coal tar, such as dibenzanthracene and chrysene. A preferred group of carbonaceous additives are polymers of aromatic hydrocarbons such as polyphenylene or polymethylphenylene which are soluble in aromatic hydrocarbons and yield on heat-decomposition up to 90% of free carbon.

If desired, free carbon in the form of a submicron powder can be admixed with the silicon carbide powder by a number of conventional techniques such as, for example, jet milling or ball milling in a liquid dispersion.

The carbonaceous organic material can be introduced by a number of techniques and heat-decomposed before or after the molded body, i.e. green body, is formed. If the carbonaceous organic material is a solid, it is preferably admixed in the form of a solution with the silicon carbide powder and boron additive to substantially coat the silicon carbide particles. The wet mixture can then be treated to remove the solvent, and the resulting dry mixture can be admixed with the binder to produce the present thermoplastically moldable ceramic mixture. In this way, a substantially uniform coating of the carbonaceous material on the silicon carbide powder is obtained which on decomposition produces a uniform distribution of free carbon. Or, if desired, the wet mixture can be heated to remove the solvent and decompose the carbonaceous organic material producing free carbon in situ before being admixed with the binder.

The binder is intimately mixed with the finely divided sinterable silicon carbide powder in a ratio that maintains the thermoplastic behavior of the binder but contains enough powder to form a self-supporting powder compact free of significant defect once the binder is removed. Specifically, the thermoplastically moldable ceramic composition is comprised of from about 40% by volume to about 60% by volume, and preferably about 50% by volume, of solids, i.e. the sinterable silicon carbide powder, and the balance is the present binder. An amount of solids less than about 40% by volume or higher than about 60% by volume is not operable as a practical matter to produce the present sintered body without significant defect.

The sinterable silicon carbide powder and the binder can be admixed by a number of conventional techniques to produce the present thermoplastically moldable ceramic composition. Preferably, the sinterable silicon carbide powder and the binder are mixed at temperatures at which the binder is molten, preferably at temperatures ranging from about 80° C. to about 180° C. Preferably, the resulting ceramic mixture is broken up into pieces to produce a more useful feed material.

A number of thermoplastic molding techniques can be used to produce the present molded body. Representative of such techniques is injection molding, extrusion, blow molding, compression molding, transfer molding, drawing and rolling.

To carry out the present thermoplastic molding, sufficient heat and pressure is applied to the ceramic composition to force it to flow to the desired degree depending on the particular thermoplastic molding process. The ceramic composition is heated to a temperature at which the binder is soft or molten depending upon the particular thermoplastic molding process. For most commercial thermoplastic forming techniques, the present ceramic composition is heated to make the binder molten at from about 80° C. to about 200° C., shaped under a pressure ranging from about 5 psi to about 30,000 psi depending upon the particular thermoplastic forming technique, and then allowed to cool and harden. For example, in the case of injection molding, the molten ceramic composition is forced into a die to produce the molded product. Specifically, for injection molding, the molten ceramic mixture, preferably at a temperature from about 130° C. to about 180° C. and under a pressure ranging from about 1000 psi to about 30,000 psi, is forced into a die where it is allowed to harden and then removed from the die. Preferably, the die is preheated to roughly from about 30° C. to about 60° C.

The resulting molded body is baked to remove the binder leaving no significant amount thereof, i.e. leaving no amount of binder which would have a significantly deleterious effect during the sintering of the body or on the sintered product. Generally, the present baking of the molded body leaves the binder in an amount of less than about 2% by weight and preferably less than about 1% by weight, of the baked body.

To carry out the removal of the binder, the molded body is embedded in the present embedding powder sufficiently to be supported by it so that the body does not suffer any significant physical distortion or incur any significant defect during baking to remove the binder. Preferably, the molded body is immersed, i.e. totally buried, in the present embedding powder. The present embedding powder is a supporting powder which prevents significant distortion of the body during baking to remove the binder and which has no significant deleterious effect on the body.

The present embedding particles are comprised of spherical or nominally spherical particles having an average diameter ranging from about 10 microns to about 1000 microns, and preferably an average diameter ranging from about 50 microns to about 200 microns. Specifically, the present embedding powder has a surface area less than 100 meters square per gram, preferably less than 10 meters square per gram, and most preferably less than 1 meter square per gram particularly for larger sized parts.

By spherical or nominally spherical embedding particles herein it is meant that the particles are shaped like a sphere, i.e. they are spherical or nearly spherical. More specifically, the embedding particles are round or nearly round, i.e. their shape does not differ significantly from the shape of a sphere.

The present embedding particles are selected from the group consisting of polycrystalline silicon carbide having a density greater than 80% of the theoretical density for silicon carbide, crystalline and/or amorphous free carbon-coated polycrystalline silicon carbide wherein the free carbon has a density greater than 80% of the theoretical density for graphite and wherein the polycrystalline silicon carbide has a density greater than 80% of the theoretical density for silicon carbide, crystalline and/or amorphous free carbon having a density greater than 80% of the theoretical density for graphite and mixtures thereof. Preferably, the present embedding particles have a density greater than 90%, and more preferably, greater than 95% of their theoretical density.

The present embedding particles of polycrystalline silicon carbide are produced according to the disclosure set forth in copending Ser. No. 599,033 FABRICATION OF SMALL DENSE SiC SPHERES, filed on even date herewith for C. A. Johnson, G. M. Renlund, C. E. VanBuren, and S. Prochazka, assigned to the assignee hereof and incorporated herein by reference, which discloses spray drying or tumbling a sinterable silicon carbide powder to produce spherical or nominally spherical agglomerates thereof, and sintering the agglomerates at a temperature ranging from about 1900° C. to about 2300° C. at or below ambient pressure to produce spherical or nominally spherical particles of polycrystalline silicon carbide having a density greater than 80% of theoretical density for silicon carbide. The sinterable silicon carbide powder of Ser. No. 599,033 and the present sinterable silicon carbide powder are of the same composition.

The present embedding particle of polycrystalline silicon carbide has a density higher than 80%, preferably higher than about 90% and most preferably it is at least about 95% or higher of the theoretical density of silicon carbide and is comprised of silicon carbide, i.e. $\alpha$-SiC, $\beta$-SiC and mixtures thereof, and from about 0.2 part, preferably from about 0.3 part by weight to about 3 parts by weight of boron, based on 100 parts by weight of silicon carbide. The polycrystalline silicon carbide particle can be free of detectable free carbon but frequently it contains a detectable amount ranging from less than about 0.1 part by weight up to about 5 parts by weight of free carbon based on 100 parts by weight of silicon carbide, substantially uniformly dispersed therein.

The compositions of the present embedding particles of polycrystalline silicon carbide and carbon-coated polycrystalline silicon carbide are the same or do not differ significantly except for the carbon coating.

A number of techniques can be used to produce a carbon coating on the present sintered silicon carbide particles, i.e. the particles produced in Ser. No. 599,033, to produce the present free carbon-coated polycrystalline silicon carbide particles.

In one technique, a fluidized bed of the sintered silicon carbide particles is used wherein methane is cracked, usually at about 1200° C., below atmospheric pressure, generally at about ½ atmosphere, to deposit pyrolytic carbon on the silicon carbide particles.

In another technique, carbon is deposited on the sintered silicon carbide particles by vaporization of the surface portion of the particles by firing them in a medium vacuum ranging from about $10^{-3}$ torr to about 25 torr, preferably from about $10^{-2}$ torr to about 1 torr, at a temperature ranging from about 1400° C. to about 2100° C., preferably from about 1900° C. to about 2100° C. Firing time is determinable empirically depending on the extent of carbon coating desired, and can range from a few minutes to about five hours, and in most instances, it ranges from about 10 minutes to 60 minutes, depending largely on firing temperature, pressure and depth of the powder bed. Generally, longer firing times are required at lower firing temperatures and with higher pressures, i.e. lower vacuums.

The carbon coating on the silicon carbide particle can be continuous or discontinuous, but preferably the carbon coating is continuous, i.e. it preferably envelops the particle. Specifically, the extent of the carbon deposition or coating on the silicon carbide particle can vary, as desired provided that the final carbon-coated silicon carbide particle has an average diameter ranging from about 10 microns to about 1000 microns and has a density greater than 80% of the theoretical density for the particle based on the amounts of carbon coating and silicon carbide.

The present embedding particles can be comprised of amorphous carbon, crystalline carbon and mixtures thereof. Representative of such embedding free carbon is glassy carbon and graphite. The present embedding free carbon particles have a density greater than 80% and preferably greater than 90% of the theoretical density of graphite.

Baking of the embedded molded body is carried out under a vacuum or in an atmosphere which has no significant deleterious effect thereon, such as argon.

The embedded molded body is baked at a heating rate or on a time-temperature schedule which removes the binder without imparting significant defect to the body up to a temperature of 450° C. During baking, the binder is thermally removed leaving no amount thereof which would have a significantly deleterious effect on the resulting sintered body. The baking should not introduce any significant defect, i.e. any service-limiting defect, such as, for example, cracks, voids and pits to the resulting baked and/or sintered body.

The allowable average heating rate or schedule to remove binder to produce parts without serious defect is dependent on the size, shape and especially the maximum cross-section thickness of the molded part. Faster average heating rates are acceptable for thinner parts, and slower average heating rates are necessary for thicker cross-sectional thicknesses. More specifically, the average heating rate to remove binder is inversely proportional or substantially inversely proportional to the maximum cross-sectional thickness of the molded piece. Therefore, for the range of useful products of commercial interest, the average heating rate to remove binder can range from about 0.1° C./hr to about 400° C./hr. As an example, the following conditions of binder removal are specific for a part with a maximum cross-sectional thickness of ~0.45 inches. The temperature is ramped from room temperature to 400° C. at ~4° C./hr, held at 400° C. for 24 hours and then furnace cooled to room temperature.

If desired, the baked body can be additionally heated to impart additional mechanical strength thereto. Such strength-imparting heating should have no significant deleterious effect on the baked body. Such strength-imparting heating can be carried out at a temperature higher than about 1000° C., for example from about 1200° C. to about 1500° C., at a heating rate which does not cause thermal shock, usually no greater than about 1000° C. per hour.

The baked body is recovered from the embedding powder. The present embedding powder releases from the baked body without requiring any scraping that might damage the body, i.e. ceramic powder compact, which at this stage is generally very weak. The extent to which the embedding powder adheres to the baked body depends largely on the geometry of the body as well as the size of the embedding particle and the particular binder used in producing the molded body. Excessive amounts of adherent embedding particles can be removed by lightly blowing the surface of the baked body with compressed air, the allowable velocity of which would depend on the strength and shape of the baked body. The amount of embedding powder that remains adherent to the recovered baked body has no significant deleterious effect on the resulting sintered body. Ordinarily, the amount of embedding powder that remains adherent to the resulting baked body is relatively thin and is no greater than a monolayer of the embedding particles.

The recovered baked body is sintered. Sintering of the baked body is carried out in an atmosphere which has no significant deleterious effect on it such as, for example, argon, helium or a vacuum. The sintering atmosphere can be at about or below atmospheric pressure, i.e. it can range from a substantial vacuum to or about atmospheric pressure. The sintered product is a pressureless sintered product, i.e. no mechanical pressure is applied to the body being sintered to increase density.

Sintering is carried out at a temperature ranging from about 1900° C. to about 2300° C., and preferably about 2000° C. to about 2100° C. The particular sintering temperature is determinable empirically and depends largely on particle size, density of the baked body, and final density desired in the sintered product with higher final densities requiring higher sintering temperatures. Also, lower sintering temperatures would be used with sintering atmospheres below atmospheric pressure. Specifically, the smaller the size of the particles in the green baked body, the lower is the required sintering temperature.

The present embedding powder is chemically compatible with the silicon carbide ceramic at the sintering temperature. The resulting sintered silicon carbide body having the present embedding particles adhered thereto has a number of uses such as, for example, a crucible or rotor. However, when desired, the present embedding particles adhered to the sintered body can be removed therefrom by any technique which has no significant deleterious effect thereon. For example, the adherent particles can be removed mechanically by, for example, sand blasting or blasting the surface of the sintered body with crushed walnut shells.

When the present embedding particles adhered to the sintered body are free carbon or free carbon coated polycrystalline silicon carbide, they can be removed by firing the sintered body in an oxidizing atmosphere such as air at a temperature ranging from about 600° C. to about 1500° C., preferably from about 600° C. to about 1000° C.

The removal of the present embedding particles from the sintered body leaves no significant defect therein. Specifically, the removal of the adherent embedding particle leaves a shallow depression in the surface or surface portion of the sintered body with a diameter which is less than that of the removed particle. Ordinarily it is less than one quarter of the diameter of the removed particle. More specifically, the removal of the embedding particle leaves essentially a mirror image of that portion of the particle that had been adhered to the surface or surface portion of the sintered body and such adhered portion always is less than one half the diameter of the particle.

The sintered body has a density higher than 80%, preferably higher than about 90% and most preferably it is at least about 95% or higher of the theoretical density of silicon carbide and is comprised of silicon carbide, i.e. $\alpha$-SiC, $\beta$-SiC and mixtures thereof, and from about 0.3 part by weight to 3 parts by weight of boron, based on 100 parts by weight of silicon carbide. The sintered body can be free of detectable free carbon but frequently it contains from less than about 0.1 part to about 5 parts by weight of free carbon substantially uniformly dispersed throughout the sintered body.

The present invention makes it possible to fabricate complex and/or hollow shaped articles of polycrystalline silicon carbide as well as simple shaped articles. Thus, articles such as gas turbine air foils, crucibles, thin-walled hollow tubes, long rods, spherical bodies and nozzles can be produced directly by the present invention.

U.S. Pat. No. 4,004,934, assigned to the assignee hereof and incorporated herein by reference, discloses the production of a sintered silicon carbide ceramic article by forming a dispersion of silicon carbide, a boron additive equivalent to about 0.3 to 3.0% by weight of boron, and elemental carbon or a carbonaceous additive in an amount equivalent to 0.1 to 1.0% by weight of elemental carbon, shaping the dispersion into a body, and sintering the body in an atmosphere chemically-inert with respect to silicon carbide at or below atmospheric pressure at from about 1900° C. to about 2100° C. until the ceramic article has a density of at least 85% of theoretical.

U.S. Pat. No. 4,041,117, assigned to the assignee hereof and incorporated herein by reference, discloses the production of a silicon carbide sintered body by providing a particulate mixture composed of $\beta$-SiC and from 0.05% to 5% by weight of $\alpha$-SiC having a particle size of at least about twice as large as that of said $\beta$-SiC particles, an additive of boron or boron carbide equivalent to 0.3% to 3.0% by weight of boron and free carbon or a carbonaceous organic material equivalent to 0.1% to 1.0% by weight of free carbon, said carbonaceous organic material completely decomposing at from about 50° C. to 1000° C. to free carbon and gaseous products of decomposition, shaping the mixture into a green body, and sintering the green body at from about 1950° C. to 2300° C. in an atmosphere in which it is substantially inert at or below atmospheric pressure to produce a sintered body having a density of at least 80% of the theoretical density for silicon carbide and containing $\alpha$-SiC in an amount of at least 70% by weight.

U.S. Pat. Nos. 4,144,207 and 4,233,256 disclose forming a mixture of a sinterable silicon carbide material, a thermoplastic resin and an oil or a wax, injection molding the mixture to produce a molded product, removing said thermoplastic resin by baking said molded product at a temperature between about 450° C. and about 1000° C. to produce a porous baked product and sintering the baked product between about 2000° C. and 2200° C. to produce a sintered product.

U.S. Pat. No. 4,312,954 discloses a sintered body produced by pressureless sintering at about 1900° C. to 2500° C., a preshaped object which is comprised of from about 91 to about 99.35 parts by weight silicon carbide containing at least 5% by weight of $\alpha$-silicon carbide, from about 0.67 to about 20 parts by weight of an organic solvent soluble organic material carbonizable to provide carbon having a carbon content of from about 25 to 75% by weight, from about 0.15 to 5 parts by weight of a boron source containing 0.15 to 3 parts by weight boron and from about 5 to 15 parts by weight of temporary binder.

Ser. No. 599,034 "THERMOPLASTIC MOLDING OF CERAMIC POWDER" filed for G. M. Renlund and C. A. Johnson on even date herewith and assigned to the assignee hereof and incorporated herein by reference, discloses the production of thermoplastically moldable ceramic composition comprised of from about 40% to about 60% by volume of a ceramic powder and a binder comprised of an organic acid and a copolymer of ethylene and from greater than about 12 weight % to about 33 weight % vinyl acetate, said organic acid having a melting point ranging from about 44° C. to about 88° C. and ranging from greater than about 18% by weight up to about 45% by weight of the binder. The ceramic composition is thermoplastically molded into a body which is baked to remove the binder and then densified to produce a polycrystalline body having a porosity of less than about 20% by volume.

The invention is further illustrated by the following Examples which, unless otherwise noted, were carried out as follows:

The sinterable silicon carbide powder was a substantially homogeneous dispersion, i.e. mixture, with an average particle size which was submicron and which was comprised of $\beta$-silicon carbide, free carbon in an amount of about 1.0% by weight of the silicon carbide and elemental boron in an amount of about 0.5% by weight of the silicon carbide. The powder contained less than about 0.4% by weight of oxygen.

The binder was comprised of stearic acid and a thermoplastic copolymer of ethylene and 25 weight % vinyl acetate. The copolymer was sold under the trademark "Elvax 350" and had a melt index of 19 and softened at about 70° C. to 90° C. The stearic acid was present in an amount of 30% by weight of the total amount of binder.

EXAMPLE 1

Fifty volume % of the sinterable silicon carbide powder was admixed with 50 volume % of the binder to produce a substantially homogeneous mixture. Specifically, the sinterable silicon carbide powder along with the stearic acid and ethylene-vinyl acetate copolymer were placed in a one-liter bowl and mixed at ambient pressure in a Haake mixer with cam rotors at approximately 110° C. for approximately 15 minutes. The resulting hot mixture was transferred to a one-quart Sigma-blade mixer and mixed at roughly 90° C. for about 10 minutes at ambient pressure and then continued mixing for about ten minutes under a vacuum of roughly about 29 inches Hg to remove air bubbles therefrom producing a substantially homogeneous mixture. The resulting mixture was placed on a sheet of aluminum foil, chopped into pieces, and allowed to cool to room temperature.

The chopped mixture, i.e. thermoplastically moldable ceramic composition, was a substantially homogeneous mixture of the binder and sinterable silicon carbide powder. It was injection molded in a 100 ton injection molding press. The press was provided with a barrel and nozzle for heating the material and a sprue bushing through which the hot thermoplastic material was passed into a die shaped to give a molded part in the form of a rotor of complex shape weighing about 150 grams. The barrel and nozzle were preheated to 180° C., the sprue bushing was preheated to 70° C. and the die was preheated to 50° C.

The mixture was placed in the barrel where it was heated for about 15 minutes until it reached uniform temperature. The resulting molten mixture was then forced under pressure through the sprue bushing into the die filling the die where its residence time was greater than 3 minutes allowing it to solidify. The injection molding pressure ranged up to about 10,000 psi. The resulting molded body was removed from the die. It had a maximum cross-sectional thickness of ~0.65 inch.

The molded body appeared free of visual defects. It was totally immersed in an embedding powder comprised of flowable spherical or nominally spherical particles of sintered polycrystalline silicon carbide which had an average diameter of approximately 50 microns and a density greater than 90% of the theoretical density for silicon carbide. The embedding particles were comprised of silicon carbide, about 0.5% by weight boron and about 1.0% by weight free carbon, based on silicon carbide. The embedding particles were produced according to the disclosure of Ser. No. 599,033 filed on even date herewith for "FABRICATION OF SMALL DENSE SiC SPHERES" by forming spray dried spherical or nominally spherical agglomerates containing $\beta$-SiC, about 0.5% by weight boron and about 1.0% by weight free uncombined carbon, based on silicon carbide, and sintering in ½ atmosphere helium at about 2080° C. The resulting embedded structure was baked under a vacuum ranging from about 5 millitorrs to about 100 millitorrs at a heating rate of 1° C. per hour to about 400° C., held at about 400° C. for 24 hours, then heated at 10° C. per hour to about 500° C. and then furnace-cooled to about room temperature. The resulting baked body was lifted out of the embedding powder and excess adherent embedding powder was removed by lightly blowing the surface of the baked body with compressed air leaving a relatively small amount of adherent embedding particles nowhere more than a monolayer in thickness.

The baked body appeared free of defect.

The baked body was sintered in an atmosphere comprised of about ½ atmosphere of helium at about 2080° C. for 30 minutes and then furnace-cooled to room temperature.

The adherent embedding particles had no significant deleterious effect on the sintered body and under high magnification could be seen as tiny bumps in the surface of the sintered body. The sintered body had a density greater than 95% of the theoretical density for silicon carbide and had a substantially uniform small grained microstructure. The sintered body appeared free of defect and would be useful as a rotor.

EXAMPLE 2

This example was carried out in substantially the same manner as disclosed for Example 1, except that 50-200 mesh charcoal, i.e. coconut charcoal, was used as the embedding powder. The charcoal particles had an irregular jagged shape and had a surface area greater than 50 meters square per gram. A crack was seen through the center of the recovered baked body. The resulting sintered body showed the same crack seen in the baked body but no additional defects were visible.

EXAMPLE 3

This example was carried out in substantially the same manner as disclosed for Example 1 except that the embedding powder was comprised of about 250 grit $\alpha$-SiC powder which was angular and jagged in shape.

After blowing the recovered baked body with air, a monolayer of these embedding particles remained adherent thereto protruding therefrom. Also, the amount of these embedding particles that remained adherent to the sintered body was significantly larger than in Example 1. In addition, in locations where the adherent embedding particles had been removed, there were sharp angular depressions or defects left in the surface of the baked body.

The resulting sintered body exhibited significant defects. Those angular depressions that were caused by removal of the embedding particles from the baked body were also exhibited by the sintered body. Such depressions cause stress concentrations in the surface of the ceramic which may cause its failure. The adhered embedding particles could not be removed mechanically from the sintered body by scraping or rubbing to any significant extent.

EXAMPLE 4

This example was carried out in substantially the same manner as disclosed for Example 1 except that the embedding powder was comprised of glass spheres which were of the order of about 30-40 mesh.

After blowing the recovered baked body with the compressed air, it was not possible to insure that all the adherent glass spheres were removed without damaging the body.

During sintering, the few remaining adherent glass spheres reacted with the silicon carbide producing significant defects in the sintered body.

EXAMPLE 5

This example was carried out in substantially the same manner as disclosed for Example 1 except that glassy carbon particles were used as the embedding powder. The glassy carbon particles were angular with sharp edges and particle size of the order of about 100 mesh in size and where comprised of impermeable amorphous carbon.

After blowing the recovered baked body with air, a monolayer of these embedding particles remained adherent thereto protruding therefrom. Also, the amount of these embedding particles that remained adherent to the sintered body was significantly larger than in Example 1. In addition, in locations where the adherent embedding particles had been removed, there were sharp angular depressions or defects left in the surface of the baked body.

The resulting sintered body exhibited significant defects. Those angular depressions that were caused by removal of the embedding particles from the baked body were also exhibited by the sintered body. Such depressions cause stress concentrations in the surface of the ceramic which may cause its failure. The adhered embedding particles could not be removed mechanically from the sintered body by scraping or rubbing to any significant extent.

However, based on other experiments and past experience, the glassy carbon particles should be removable by firing the sintered body in air above 600° C. to oxidize the carbon but such oxidation would leave angular depressions in the surface portion of the sintered body.

EXAMPLE 6

This example was carried out in substantially the same manner as disclosed for Example 1 except that the sinterable silicon carbide powder along with the stearic acid and ethylene-vinyl acetate copolymer were mixed in a Sigma-mixer at ambient pressure for about an hour at a temperature of roughly about 120° C. to about 140° C. and then continued mixing for about 10 minutes under a vacuum of approximately 29 inches of Hg to remove air bubbles.

In this example, the barrel and nozzle of the injection molding press were preheated to 130° C. The resulting molded body was immersed in the embedding powder and was heated at a rate of 1° C. per hour to about 400° C., held 24 hours at about 400° C., and then it was furnace-cooled to room temperature.

The resulting baked body was lifted out of the embedding powder and excess adherent embedding powder was removed by lightly blowing the surface of the baked body with compressed air leaving a relatively small amount of adherent embedding particles nowhere more than a monolayer in thickness.

The baked body appeared free of defect.

The baked body was sintered in an atmosphere comprised of about ½ atmosphere of helium at about 2080° C. for 30 minutes and then furnace-cooled to room temperature.

The adherent embedding particles had no significant deleterious effect on the sintered body and under high magnification could be seen as tiny bumps in the surface of the sintered body. The sintered body had a density greater than 95% of the theoretical density for silicon carbide and had a substantially uniform small grained microstructure. The sintered body appeared free of defect and would be useful as a rotor.

Examples 1-6 are shown in Table I where Examples 1 and 6 illustrate the present invention. Although the binder removal baking in Example 1 was extended to 500° C., other experiments and particularly Example 6 show that this binder was removed by 450° C. leaving no amount therein which would have a significantly deleterious effect on the sintered product.

Also, although in Examples 1-5 baking of the embedded body was extended to 500° C., other experiments and past experience have shown that the results with these embedding powders would have been the same at baking temperatures up to 450° C. to remove binder.

TABLE I

| Example | Binder | Molding Solids Loading | Molding Pressure (psi) | Molding Nozzle and Barrel Temp. | Condition of Molded Body wt (g) | | Embedding Powder | Binder Removal Heating Schedule |
|---|---|---|---|---|---|---|---|---|
| 1 | Polyethylene - 25 w/o vinyl acetate copolymer, melt index = 19, plus 30 w/o stearic acid | 50 v/o | 10,000 | ~180° C. | ~150 | No observed defects | SIC spheres | 1° C./hr to ~400° C., held at ~400° C. for 24 hrs, then 10° C./hr to ~500° C. |
| 2 | Polyethylene - 25 w/o vinyl acetate copolymer, melt index = 19, plus 30 w/o stearic acid | 50 v/o | 10,000 | ~180° C. | ~150 | " | Charcoal (coconut) | 1° C./hr to ~400° C., held at ~400° C. for 24 hrs, then 10° C./hr to ~500° C. |
| 3 | Polyethylene - 25 w/o vinyl acetate copolymer, melt index = 19, plus 30 w/o stearic acid | 50 v/o | 10,000 | ~180° C. | ~150 | " | SIC grinding grit (250 grit) | 1° C./hr to ~400° C., held at ~400° C. for 24 hrs, then 10° C./hr to ~500° C. |
| 4 | Polyethylene - 25 w/o vinyl acetate copolymer, melt index = 19, plus 30 w/o stearic acid | 50 v/o | 10,000 | ~180° C. | ~150 | " | Glass spheres | 1° C./hr to ~400° C., held at ~400° C. for 24 hrs, then 10° C./hr to ~500° C. |
| 5 | Polyethylene - 25 w/o vinyl acetate copolymer, melt index = 19, plus 30 w/o stearic acid | 50 v/o | 10,000 | ~180° C. | ~150 | " | Glassy carbon | 1° C./hr to ~400° C., held at ~400° C. for 24 hrs, then 10° C./hr to ~500° C. |
| 6 | Polyethylene - 25 w/o vinyl | 50 v/o | 10,000 | ~130° C. | ~150 | " | SIC spheres | 1° C./hr to ~400° C. + held 24 hrs at ~400° C. |

TABLE I-continued

| | | acetate copolymer, melt index = 19, plus 30 w/o stearic acid | | | | |

| Example | Binder | Condition of Baked Body | Sintering Temp. | Time | Atmosphere | Sintered Body |
| --- | --- | --- | --- | --- | --- | --- |
| 1 | Polyethylene - 25 w/o vinyl acetate copolymer, melt index = 19, plus 30 w/o stearic acid | No observed defects | ~2080° C. | 30 min | ½ atm He | No observed defects |
| 2 | Polyethylene - 25 w/o vinyl acetate copolymer, melt index = 19, plus 30 w/o stearic acid | Crack through center of part | ~2080° C. | 30 min | ½ atm He | No additional defects |
| 3 | Polyethylene - 25 w/o vinyl acetate copolymer, melt index = 19, plus 30 w/o stearic acid | Significant SIC grit embedded in recovered baked body | ~2080° C. | 30 min | ½ atm He | No macroscopic flaws were seen but significant amount of angular SIC grit tightly embedded in the sintered part's surface - virtually impossible to remove |
| 4 | Polyethylene - 25 w/o vinyl acetate copolymer, melt index = 19, plus 30 w/o stearic acid | Same glass spheres embedded in recovered baked body | ~2080° C. | 30 min | ½ atm He | No macroscopic flaws seen. Since not all the glass spheres could be removed prior to sintering, the glass reacted with the SIC part during sintering and created pits extending from surface |
| 5 | Polyethylene - 25 w/o vinyl acetate copolymer, melt index = 19, plus 30 w/o stearic acid | Glassy carbon particles embedded in recovered baked body | ~2080° C. | 30 min | ½ atm He | No macroscopic flaws seen. However, glassy carbon stuck to surface should be removed by firing part in air above 600° C. oxidizing carbon but would leave behind angular depressions in the surface of sintered part |
| 6 | Polyethylene - 25 w/o vinyl acetate copolymer, melt index = 19, plus 30 w/o stearic acid | No observed defects | ~2080° C. | 30 min | ½ atm He | No observed defects |

EXAMPLE 8

A sintered silicon carbide body was prepared in substantially the same manner as disclosed in Example 1.

The sintered body was blasted with walnut shells having a size of the order of conventional sand blasting grit to remove the embedding particles. The resulting sintered body was free of any significant defect and would be useful as a rotor. Examination of the sintered body under high magnification showed that the removed embedding particle left a shallow depression in the surface of the sintered body. The shallow depression had a diameter less than one quarter of the diameter of the removed particle.

EXAMPLE 9

This is a paper example.

This example would be carried out according to the disclosure of Example 6 except that the embedding powder would be comprised of flowable spheres of graphite with a density greater than 90% of the theoretical density of graphite and would have an average diameter of about 100μ.

The baked body would be free of significant defect.

The resulting sintered body would be useful as a rotor.

If desired, the sintered body could be fired in air at 650° C. to remove the embedding particles adherent to the sintered body. The fired sintered body would exhibit no significant defect and would be useful as a rotor.

EXAMPLE 10

This is a paper example.

This example would be carried out according to the disclosure of Example 6 except that the embedding powder would be comprised of flowable spherical or nominally spherical particles of free carbon coated polycrystalline silicon carbide having an average diameter of about 120μ wherein the carbon would have a density greater than 90% of the theoretical density for graphite and wherein the polycrystalline silicon carbide would have a density greater than 90% of the density of silicon carbide. The carbon coating would envelop the particle.

The baked body would be free of significant defect.

The resulting sintered body would be useful as a rotor.

If desired, the sintered body could be fired in air at 650° C. to remove the embedding particles adherent to the sintered body. The fired sintered body would exhibit no significant defect and would be useful as a rotor.

What is claimed is:

1. In the process of producing a sintered body of polycrystalline silicon carbide having a density greater than 80% of the theoretical density for silicon carbide wherein a thermoplastically molded body of sinterable silicon carbide powder and thermoplastic binder is formed, baked to remove said binder and sintered to produce said sintered body, the improvement comprising embedding said molded body in spherical or nominally spherical embedding particles selected from the group consisting of polycrystalline silicon carbide having a density greater than 80% of the theoretical density for silicon carbide, crystalline and/or amorphous free carbon-coated polycrystalline silicon carbide wherein the free carbon has a density greater than 80% of the theoretical density of graphite and wherein the polycrystalline silicon carbide has a density greater than 80% of the theoretical density for silicon carbide, crystalline and/or amorphous free carbon having a density greater than 80% of the theoretical density of graphite and mixtures thereof, said embedding particles having an average diameter ranging from about 10 microns to about 1000 microns, and baking said embedded body to thermally remove said binder leaving no amount thereof which would have a significantly deleteriously effect on said sintered body and recovering said baked body.

2. The process according to claim 1 wherein said molded body is immersed in said embedding powder.

3. The process according to claim 1 wherein the resulting sintered body with adherent embedding particles is mechanically treated to remove said adherent embedding particles.

4. The process according to claim 1 wherein said embedding particles are said free carbon-coated polycrystalline silicon carbide or said free carbon and the resulting sintered body with adherent embedding particle is fired in air at a temperature ranging from about 600° C. to about 1500° C. to remove said adherent embedding particle.

5. The method according to claim 1 wherein said embedding particle is said polycrystalline silicon carbide.

6. The method according to claim 1 wherein said embedding particle is said free carbon-coated polycrystalline silicon carbide.

7. The method according to claim 1 wherein said embedding particle is free carbon.

8. A process for producing a sintered polycrystalline silicon carbide body which comprises forming a thermoplastically moldable ceramic composition comprising a substantially homogeneous mixture comprising from about 40% by volume to about 60% by volume of a sinterable silicon carbide powder having an average particle size which is submicron and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive selected from the group consisting of free carbon, a carbonaceous organic material and mixtures thereof equivalent to from about 0.1% by weight to about 5% by weight of free carbon based on said silicon carbide, said carbonaceous organic material completely decomposing at a temperature ranging from 50° C. up to 450° C. to said free carbon and gaseous product of decomposition, and the balance being a thermoplastic organic binder which is thermally removable at a temperature ranging up to 450° C., thermoplastically molding said ceramic composition producing a molded body, embedding said molded body in spherical or nominally spherical embedding particles selected from the group consisting of polycrystalline silicon carbide having a density greater than 80% of the theoretical density for silicon carbide, crystalline and/or amorphous free carbon-coated polycrystalline silicon carbide wherein the free carbon has a density greater than 80% of the theoretical density of graphite and wherein the polycrystalline silicon carbide has a density greater than 80% of the theoretical density for silicon carbide, crystalline and/or amorphous free carbon having a density greater than 80% of the theoretical density of graphite and mixtures thereof, said embedding particles having an average diameter ranging from about 10 microns to about 1000 microns, baking said embedded molded body at a heating rate which has no significant deleterious effect thereon at a temperature ranging up to 450° C. removing said binder leaving no amount therein which would have a significantly deleterious effect on said sintered body, said baking having no significant deleterious effect on said body, recovering the resulting baked body and sintering said baked body at a temperature ranging from about 1900° C. to about 2300° C. producing said sintered body having a density greater than 80% of the theoretical density for silicon carbide.

9. The process according to claim 8 wherein said molded body is immersed in said embedding powder.

10. The process according to claim 8 wherein the resulting sintered body with adherent embedding particles is mechanically treated to remove said adherent embedding particles.

11. The process according to claim 8 wherein the embedding particles are said free carbon-coated polycrystalline silicon carbide or said free carbon and the resulting sintered body with adherent embedding particle is fired in air at a temperature ranging from about 600° C. to about 1500° C. to remove said free carbon.

12. The method according to claim 8 wherein said embedding particle is said polycrystalline silicon carbide.

13. The method according to claim 8 wherein said embedding particle is said free carbon-coated polycrystalline silicon carbide.

14. The method according to claim 8 wherein said embedding particle is free carbon.

* * * * *